No. 621,655. Patented Mar. 21, 1899.
W. D. GRAVES.
BELT SHIFTER.
(Application filed Sept. 26, 1898.)
(No Model.)
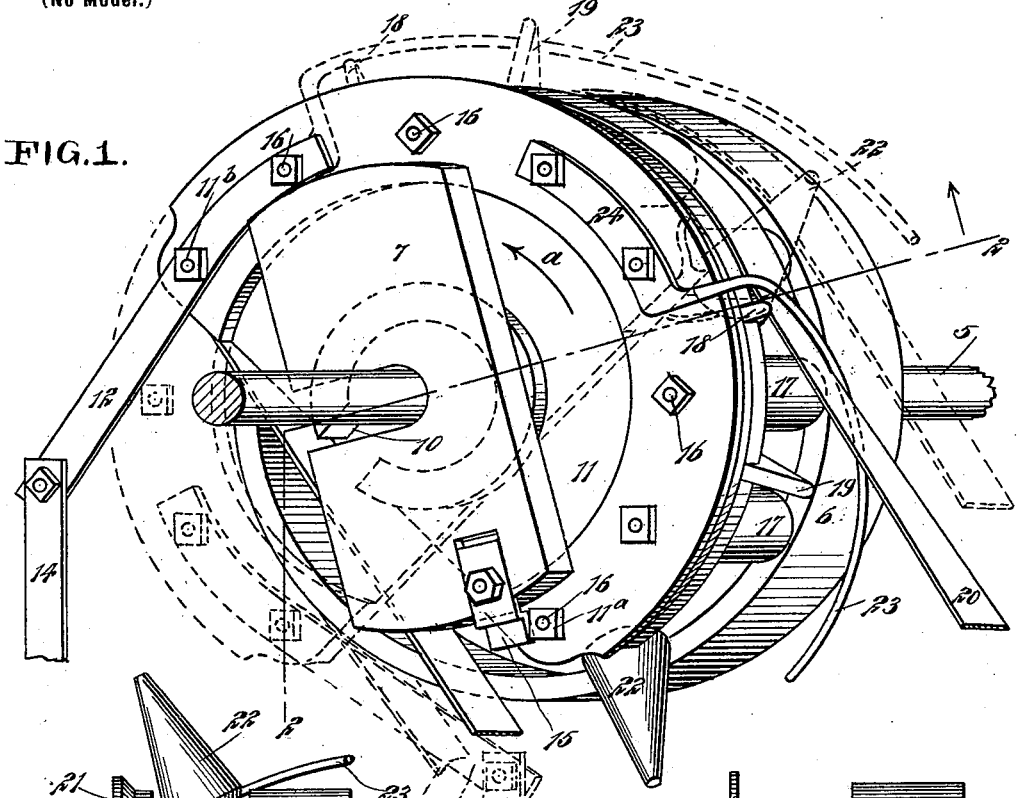
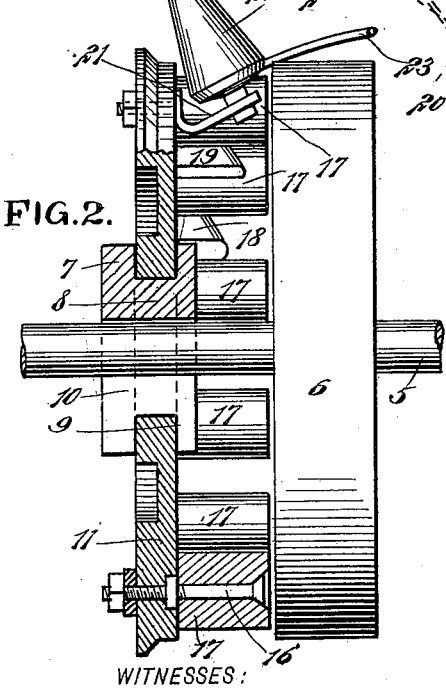
WITNESSES:
Donn Twitchell
Isaac B. Owens
INVENTOR
William D. Graves
BY
ATTORNEYS
THE NORRIS PETERS CO., PHOTO-LITHO., WASHINGTON, D. C.

UNITED STATES PATENT OFFICE.

WILLIAM D. GRAVES, OF ST. ANSGAR, IOWA.

BELT-SHIFTER.

SPECIFICATION forming part of Letters Patent No. 621,655, dated March 21, 1899.

Application filed September 26, 1898. Serial No. 691,906. (No model.)

*To all whom it may concern:*

Be it known that I, WILLIAM D. GRAVES, of St. Ansgar, in the county of Mitchell and State of Iowa, have invented a new and Improved Belt-Shifter, of which the following is a full, clear, and exact description.

My invention relates to a belt-shifter of that class in which means are provided for throwing the belt on and off the driving-pulley, the invention being characterized by a loose pulley or holder on which the belt is supported when thrown off the driving-pulley and provided with devices by which to move the belt sidewise to place and displace the same.

This invention is a disclosure of one form of my invention, while the claims define the actual scope thereof.

Reference is to be had to the accompanying drawings, forming part of this specification, in which similar characters of reference indicate corresponding parts in all the figures.

Figure 1 is a perspective view of my invention, dotted lines being employed to show the action of the loose pulley or holder. Fig. 2 is an elevational view with parts in section on the line 2 2 in Fig. 1. Fig. 3 is an elevational view of a modified form of my invention, and Fig. 4 is a detail section of the hub of the loose pulley or holder shown in Figs. 1 and 2.

Referring to Figs. 1, 2, and 4, the shaft 5 to be driven is held in suitable bearings, (not shown in the drawings,) and fixed to this shaft is the driving-pulley 6. Held fast to a stationary frame or other support (not shown) is a block 7, provided with a neck 8, having a flange 9 at its inner end. The block 7, neck 8, and the flange 9 are formed with an opening 10, leading to one edge of the block, through which opening the shaft 5 may be passed to place the block 7, with its parts, in position, the shaft resting in the inner end of the opening 10. Mounted to turn on the neck 8 between the block 7 and the flange 9 is the loose pulley or belt-holder 11, which is approximately semicircular in form, as may be best seen in Fig. 1, and which is provided with a fixed arm 12 and a swinging link 14, by means of which the holder 11 may be turned, as indicated by dotted lines in Fig. 1. Fast to the block 7 and at one end thereof is a stop 15, which serves to limit the throw of the pulley or holder 11, for which purpose the stop 15 is projected from the block 7 into close proximity to the face of the pulley or holder 11. This stop 15 serves to limit the movement of the pulley 11 by engagement with the nut $11^a$ on the one hand and the nut $11^b$ on the other hand. It will thus be seen that the stationary block 7, with its neck 8 and flange 9, serves to hold the loose pulley or belt-holder 11 in such a manner as to permit the same to turn loosely on the shaft 5, as may be required in the operation of the apparatus.

Bolted fast to the pulley or holder 11 and projecting from the inner face thereof are a series of spindles 16, one of which is fully shown in Fig. 2, and these spindles 16 respectively carry loose rollers 17. The rollers 17 are arranged concentrically with respect to the curved edge of the pulley or holder 11 and are adapted to carry the belt when the same is inactive, as is shown in Fig. 1. Fast to the inner face of the pulley or holder 11 and projecting beyond the periphery thereof are triangular plates 18 and 19, each forming a belt-shifting stud. These plates 18 and 19 may be of any desired number and have perpendicular outer edges, their inner edges being inclined toward the driving-pulley 6, so that when the pulley or holder 11 is turned in the direction of the arrow $a$ in Fig. 1 the plate 18, first, and the plate 19, secondly, engage the left-hand edge of the belt 20 and throw the same to the right, as shown in Fig. 1. Attached to the inner face of the pulley or holder 11 is a bracket 21, which carries a conical roller 22, the axis of which is disposed diagonally with reference to the plane of the pulley or holder 11. The base or larger end of this roller 22 is brought into immediate proximity to the pulley 6, so that as the pulley or holder 11 is thrown the plates 18 and 19 first partly move the belt and the roller 22 finishes the movement by throwing the belt completely on the driving-pulley 6. The belt therefore is thrown on the driving-pulley 6 by turning the loose pulley or holder 11 in the direction of the arrow $a$, (that being the direction in which the pulley 6 is running,) which causes the parts 18, 19, and 22 to act in the manner described. The belt is thrown off the driving-pulley and on the loose pulley or holder 11 by means of a diagonal shifting arm 23, the shank 24 of which is bolted to the outer face of the loose pulley or holder 11. The shifting arm 23 extends diagonally across the faces of the pulley or holder 11 and the driving-pulley 6 and has its outer end slightly curved, so as to engage around the right-hand edge of the belt 20. (See Fig. 1.) Consequently should the pulley or holder 11 be turned in the direction opposite that indicated by the arrow $a$ in Fig. 1 the shifting arm 23 will engage with the right-hand edge of the belt 20 and crowd the same to the left in said Fig. 1, so that the belt will be thrown from the face of the pulley 6 onto the rollers 17, by which rollers the belt is held during its inactivity.

The modification of my invention in Fig. 3 consists of a driving-pulley $6^a$ similar to the pulley 6, before described, and mounted on the shaft $5^a$. The loose pulley or holder $11^a$ is carried loosely on the shaft $5^a$, and in place of the rollers 17 the pulley $11^a$ is provided with a broad flange 25, forming the face of the pulley. In place of the plates 18 and 19 and the conical roller 22 I form on the pulley or holder $11^a$ a diagonally-disposed shifting flange 26, that inclines toward the pulley $6^a$, so that should the loose pulley or holder $11^a$ turn in the direction of the arrow $a'$ in Fig. 3 the flange 26 will act against the left-hand edge of the belt to throw the belt on the pulley $6^a$. The pulley $11^a$ has its flange or face 25 slightly eccentric to the shaft $5^a$ and pulley $6^a$, the flange or face 25 running into the plane of the face and pulley $6^a$ at the end of the flange 26, which end is nearest the pulley $6^a$, so that by the joint action of the flange 26 and this eccentric portion of the face of the pulley $11^a$ the belt is thrown from the pulley $11^a$ to the pulley $6^a$. The belt is thrown back from the driving-pulley to the loose pulley by means of an arm $23^a$, fastened by its shank $24^a$ to the pulley $11^a$ in a manner similar to that described in reference to the parts 23 and 24 in Fig. 1. If desired, the pulley $11^a$ may be thrown back and forth by means of a pinion 27, driven by a rack or other suitable gearing, or, if desired, a sprocket and chain may be used for the same purpose.

Having thus fully described my invention, I claim as new and desire to secure by Letters Patent—

1. The combination of a shaft, a driving-pulley thereon, a loose pulley or belt-holder supported loosely on the shaft adjacent to the driving-pulley, an arm attached to the loose pulley or holder and extending diagonally across the face thereof and across the face of the driving-pulley, to throw the belt from the driving-pulley, and means carried by the loose pulley, by which to throw the belt from the same to the driving-pulley, substantially as described.

2. The combination of a shaft, a driving-pulley thereon, a block supported independently of the shaft, a loose pulley or belt-holder mounted to turn on the block, rollers attached to the loose pulley or belt-holder to carry the belt when inactive, belt-shifting studs attached to the inner face of the loose pulley or holder and serving to assist in throwing the belt to the driving-pulley, a shifting roller carried by the loose pulley or holder and coacting with the shifting studs, and an arm attached to the loose pulley or holder and extending diagonally across the face of the two pulleys to throw the belt onto the driving-pulley, substantially as described.

3. The combination of a shaft, a driving-pulley thereon, a block supported independently of the shaft, a loose pulley or holder mounted on the block, and means on the loose pulley or holder by which to throw the belt on and off the driving-pulley, substantially as described.

4. The combination of a shaft, a block supported independently of the same, a neck formed on the block, a flange formed on the neck, a loose pulley or holder mounted on the neck of the block, a driving-pulley, and means on the loose pulley or holder by which to throw the belt on and off the driving-pulley, substantially as described.

5. The combination of a driving-pulley, a loose pulley or holder, rollers attached to the loose pulley or holder and serving to carry the belt when inactive, shifting studs carried on the loose pulley and serving to assist in throwing the belt on the driving-pulley, and a conical shifting roller also carried on the loose pulley, and extending into proximity to the driving-pulley so as to complete the movement of the belt toward the driving-pulley, substantially as described.

6. The combination of a driving-pulley, a block supported independently of the same, a loose pulley or holder turning on the block, a stop attached to the block and serving to limit the movement of the loose pulley or holder, and means on the loose pulley or holder by which to throw the belt on and off the driving-pulley, substantially as described.

7. The combination of a shaft, a belt-holder supported loosely on the shaft and adapted to stand alongside a driving-pulley on the shaft, and an arm attached to the belt-holder and extending diagonally across the face thereof, and projecting beyond the belt-holder so as to reach over the face of the driving-pulley, whereby to throw the belt from said pulley.

WILLIAM D. GRAVES.

Witnesses:
CARL CHRISTENSEN,
ED. GOATLEY.